United States Patent [19]

Wehren

[11] Patent Number: 5,613,819
[45] Date of Patent: Mar. 25, 1997

[54] FASTENING ASSEMBLY FOR A DEVICE IN A HOUSING WALL

[75] Inventor: Wilhelm Wehren, Kerpen/Blatzheim, Germany

[73] Assignee: Ford Motor Company, Dearborn, Mich.

[21] Appl. No.: 562,481

[22] Filed: Nov. 24, 1995

[30] Foreign Application Priority Data

Dec. 16, 1994 [DE] Germany .................. 44 44 922.4

[51] Int. Cl.⁶ .................................................. F16B 21/18
[52] U.S. Cl. ..................... 411/527; 411/525; 411/999; 411/526
[58] Field of Search ..................... 411/915, 999, 411/542, 527, 525, 516, 521, 437, 352, 353

[56] References Cited

U.S. PATENT DOCUMENTS

| | | | |
|---|---|---|---|
| 2,712,262 | 7/1955 | Knohl . | |
| 4,612,501 | 9/1986 | Costello et al. | 411/525 |
| 4,878,085 | 10/1989 | Ward et al. | 411/915 |
| 5,074,727 | 12/1991 | Wentzel | 411/999 |
| 5,195,860 | 3/1993 | Steyn | 411/526 |
| 5,244,325 | 9/1993 | Knohl | 411/999 |

FOREIGN PATENT DOCUMENTS

| | | | |
|---|---|---|---|
| 0414690 | 12/1991 | European Pat. Off. . | |
| 1295285 | 5/1969 | Germany | 411/527 |
| 3009716 | 10/1985 | Germany . | |
| 883010 | 11/1961 | United Kingdom | 411/527 |

Primary Examiner—Steven N. Meyers
Assistant Examiner—Tuyet-Phuong Pham
Attorney, Agent, or Firm—Frank G. McKenzie

[57] ABSTRACT

In a fastening arrangement for a sensor (1) which can be inserted through a bore (3) in a wall (2) of a housing and is sealed and held releasably by means of an O-ring (10) and a cup-spring-like retaining ring (11), the sensor (1), together with the cup-spring-like retaining ring (11) seated on a shoulder (7), can be forced in axially with the cylindrical outer circumference (12) of the retaining ring (11) in clamping engagement with the enlarged portion (4) of the bore (2) in the wall, the O-ring (10) can be axially loaded between the shoulder (7) and the step (5) which terminates the enlarged portion (4), and the sensor (1) can be fixed axially by the inner circumference (13) of the retaining ring clamping its cylindrical shaft (6).

3 Claims, 1 Drawing Sheet

FASTENING ASSEMBLY FOR A DEVICE IN A HOUSING WALL

BACKGROUND OF THE INVENTION

1. Technical Field

The invention relates to an arrangement for fastening and sealing a device in a wall of a housing.

2. Description of the Prior Art

A fastening arrangement for a sensor of this general kind is known from European Patent 0 414 690.

In the case of this known fastening arrangement for a sensor, there is no provision for fine adjustment of the position of the sensor, and, moreover, to hold the sensor, in addition to the cup-spring-like retaining ring, an additional retaining ring in the form of two halves of an annular washer must be fitted in a groove in the sensor. For fitting and removal, the sensor must be accessible from both sides of the wall.

German Patent 30 09 716 discloses a retaining element for a nut that can be fitted on a threaded bolt, the element consisting of a resilient sheet metal ring the inner circumference of which forms a thread that is interrupted at one point.

However, this known retaining element does not enable the component that is to be fastened to be simply pressed in, and is not able to seal the component with respect to the housing in which it is received.

SUMMARY OF THE INVENTION

It is an object of the invention to improve a fastening arrangement for a sensor of the kind referred to so that, as well as providing reliable sealing, it is possible to perform subsequent fine adjustment of the sensor so that the sensor can be removed with access from only one side of the wall.

According to the invention, this object is achieved if, in a fastening arrangement for a sensor of the kind referred to, the sensor, together with the cup-spring-like retaining ring seated on a shoulder and the prepositioned O-ring, can be forced in axially with the cylindrical outer circumference of the retaining ring in clamping engagement with an enlarged portion of the bore in the wall which terminates in a step; the O-ring can be axially loaded between the shoulder and the step; and the sensor can be fixed by the inner circumference of the retaining ring, which constitutes a thread, clampingly engaging its cylindrical shaft.

This enables the sensor to be fitted by simply plugging it into the bore using a predetermined force, while deforming the cup-spring-like retaining ring, whereafter fine adjustment can be effected by turning the sensor. The sensor can be removed in an equally simple manner by twisting it out along the thread.

BRIEF DESCRIPTION OF THE DRAWINGS

The invention will now be described in more detail with reference to an embodiment shown in the drawings, in which.

DESCRIPTION OF A PREFERRED EMBODIMENT

Figure 1:
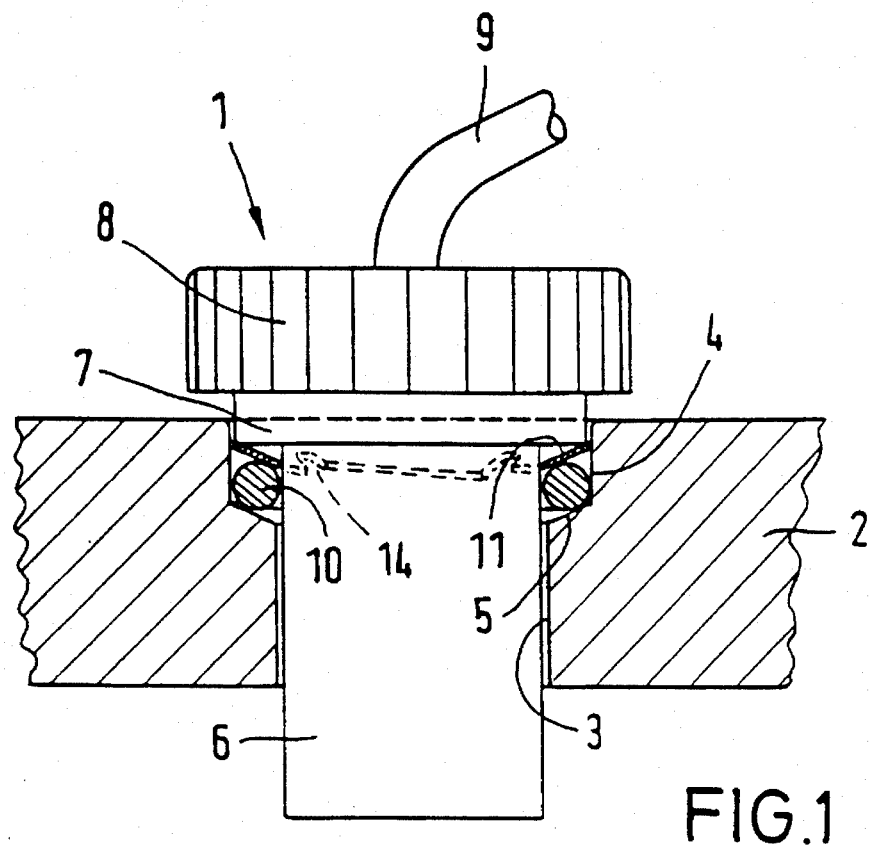
FIG. 1 shows a vertical cross section along the axis of the sensor located in its fitted position in a wall.

As can be seen from FIG. 1, a sensor 1 is inserted in a wall 2 of a housing. For this purpose, the wall 2 has a bore 3 having an enlarged portion 4 and a shoulder 5.

The sensor 1 has a cylindrical shaft 6 with an enlarged shoulder 7, which is adjoined by a further enlarged hand grip 8. The sensor 1 is inserted into the bore 3 of the housing 2 in order to detect, by means of its shaft 6, measured or numerical values inside the housing, which are taken out through a lead 9 to a processing unit (not shown).

According to the invention, an O-ring 10 and a cup-spring-like retaining ring 11 are disposed between the shoulder 5 in the bore 3 and the enlarged shoulder 7 of the sensor 1 which projects into it.

Figure 2:
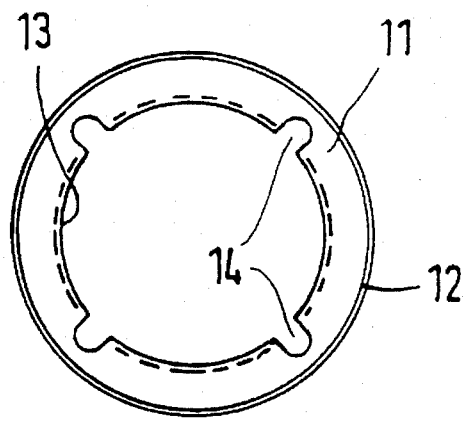
FIG. 2 is a plan view from above the cup-spring-like retaining ring of FIG. 1.

The design of the cup-spring-like retaining ring 11 will be explained in more detail with reference to FIG. 2.

The cup-spring-like retaining ring 11 is shaped as a downwardly-pointing cone and has a cylindrical outer circumference 12 and an inner circumference 13 in the form of a screw thread. To guarantee the screwing action, the inner circumference 13 is interrupted at at least one point, and preferably at four points, by a gap 14.

The assembly of the fastening arrangement in accordance with the invention will now be described.

The cup-spring-like retaining ring 11 is first placed on the shaft 6 of the sensor 1 with its inner circumference 13 lightly clamping the shaft, and then the O-ring 10 is slipped on. The sensor 1 is then inserted into the bore 3 in the housing 2 by simply pressing it in axially.

The outer circumference 12 of the cup-spring-like retaining ring 11 is designed so that it can only be inserted clampingly into the enlarged portion 4 of the bore 3. Through further axial sliding the cup-spring-like retaining ring 11, which has its outer circumference 12 clamped in place on the enlarged portion 4, is further conically deformed, thereby compressing the O-ring 10 against the shoulder 5 so that it forms a seal with respect to both the circumference of the enlarged portion 4, shoulder 5, and cylindrical shaft 6.

The sensor 1 is now held in the housing 2 by the resilient engagement of the cup-spring-like retaining ring 11 both inwardly with shaft 6 and outwardly with portion 4.

If it is now desired to make a fine adjustment to the position of the sensor, the thread 13 enables controlled inward or outward movements to be effected by turning the hand grip 8.

For complete dismantling, the sensor 1 can be screwed right out.

It can readily be appreciated that if the housing 2 and sensor 1 are made of light metal, the corresponding resilient locking of the cup-spring-like retaining ring made of spring steel enables the sensor to be held securely.

What is claimed is:

1. An assembly, comprising:

a wall having a bore extending therethrough, and a portion having a larger size than the bore, extending partially through the wall, substantially aligned with the bore, the bore and said portion defining a step in the wall;

a device located in the bore, having a shaft portion and a shoulder located adjacent the step;

a seal surrounding the device, located in the bore between the step and shoulder;

a retaining ring surrounding the device, has an inner circumference located adjacent the shaft portion, an outer circumference located adjacent the wall, and an inclined thread on the inner circumference that is located axially at one diametrical side higher than it's location at an opposite side so that the thread engages and clamps against the shaft portion as the shoulder compresses the seal against the step.

2. The assembly of claim 1 wherein the inner circumference of the retaining ring, further comprises at least one cut interrupting the thread.

3. The assembly of claim 1 wherein the inner circumference of the retaining ring further comprises four cuts mutually angularly spaced about the inner circumference.

* * * * *